US011619339B2

(12) United States Patent
Lee et al.

(10) Patent No.: US 11,619,339 B2
(45) Date of Patent: Apr. 4, 2023

(54) SUPPORTING DEVICE (71) Applicant: SYNCMOLD ENTERPRISE CORP., New Taipei (TW)

(72) Inventors: Yi-Xin Lee, New Taipei (TW); Chuan-Min Chung, New Taipei (TW); Wen-Chen Liu, New Taipei (TW)

(73) Assignee: SYNCMOLD ENTERPRISE CORP., New Taipei (TW)

( * ) Notice: Subject to any disclaimer, the term of this patent is extended or adjusted under 35 U.S.C. 154(b) by 0 days.

(21) Appl. No.: 17/388,578

(22) Filed: Jul. 29, 2021

(65) Prior Publication Data

US 2022/0049813 A1    Feb. 17, 2022

Related U.S. Application Data (60) Provisional application No. 63/064,729, filed on Aug. 12, 2020.

(30) Foreign Application Priority Data

May 24, 2021    (TW) ................................. 110205957

(51) Int. Cl.
| F16M 11/18 | (2006.01) |
| F16M 11/20 | (2006.01) |
| F16M 11/24 | (2006.01) |
| F16M 11/04 | (2006.01) |
| F16M 11/12 | (2006.01) |

(52) U.S. Cl.
CPC ............ *F16M 11/18* (2013.01); *F16M 11/046* (2013.01); *F16M 11/125* (2013.01); *F16M 11/2014* (2013.01); *F16M 11/24* (2013.01); *F16M 2200/024* (2013.01); *F16M 2200/08* (2013.01)

(58) Field of Classification Search
CPC ............ F16M 11/2028; F16M 11/105; F16M 11/2021; F16M 11/125; F16M 11/046; F16M 11/18
See application file for complete search history.

(56) References Cited

U.S. PATENT DOCUMENTS 2,453,442 A * 11/1948 Lewis ................ F16M 11/2021
                                                                248/167
6,655,645 B1 * 12/2003 Lu ...................... F16M 11/2014
                                                                248/176.1

(Continued)

*Primary Examiner* — Christopher Garft
(74) *Attorney, Agent, or Firm* — Muncy, Geissler, Olds & Lowe, P.C.

(57) ABSTRACT

A supporting device for supporting a display is provided. The supporting device includes an upright, a slider, a bearing module, a driving module, a transfer module, and a control module. The slider is slidably disposed in the upright, and partially extending outward from the upright. The bearing module includes a bearing board and a supporting element. The bearing board bears the display, and the supporting element is connected to the slider. The transfer module is connected between the driving module and the bearing board. The control module is electrically connected to the driving module, and controls the driving module to drive the transfer module to make the bearing board rotate about the normal axis and relative to the supporting element, and the display changes between a portrait state and a landscape state.

16 Claims, 10 Drawing Sheets (56) References Cited

U.S. PATENT DOCUMENTS

| | | | | |
|---|---|---|---|---|
| 6,712,321 B1* | 3/2004 | Su | ................... | F16M 11/2064 |
| | | | | 248/917 |
| 7,063,424 B1* | 6/2006 | Brinkman | ............. | G03B 21/58 |
| | | | | 353/74 |
| 7,296,774 B2* | 11/2007 | Oh | ...................... | F16M 11/18 |
| | | | | 348/825 |
| 7,677,517 B2* | 3/2010 | Suzuki | ................ | F16M 11/22 |
| | | | | 248/922 |
| 7,878,470 B2* | 2/2011 | Oh | ...................... | F16M 13/02 |
| | | | | 248/278.1 |
| 8,205,849 B2* | 6/2012 | Shimizu | ............... | F16M 11/18 |
| | | | | 248/176.2 |
| 9,791,095 B2* | 10/2017 | Chen | ................. | F16M 11/10 |
| 9,822,921 B2* | 11/2017 | Chen | ................. | F16M 11/041 |
| 9,857,020 B2* | 1/2018 | Yeh | .................... | F16M 11/30 |
| 10,309,578 B2* | 6/2019 | Yen | ................... | F16M 11/041 |
| 10,663,105 B2* | 5/2020 | Chen | ................ | F16M 11/2014 |
| 11,320,088 B1* | 5/2022 | Ding | ................. | F16M 11/18 |
| 2005/0035246 A1* | 2/2005 | Coleman | ............ | F16M 11/18 |
| | | | | 248/349.1 |
| 2005/0151043 A1* | 7/2005 | Kim | ................... | F16M 11/105 |
| | | | | 345/905 |
| 2008/0236014 A1* | 10/2008 | Chao | ................. | F16M 11/105 |
| | | | | 40/747 |
| 2009/0173702 A1* | 7/2009 | Hung | ................ | F16M 11/18 |
| | | | | 211/26 |
| 2010/0061041 A1* | 3/2010 | Chen | ................. | F16M 11/105 |
| | | | | 361/679.01 |
| 2019/0316729 A1* | 10/2019 | Gurr | .................. | F16F 15/10 |
| 2020/0293255 A1* | 9/2020 | Lim | ................... | F16M 11/18 |
| 2021/0191520 A1* | 6/2021 | Yang | ................. | G06F 1/1601 |
| 2021/0293371 A1* | 9/2021 | Choi | ................. | F16M 11/105 |
| 2022/0049814 A1* | 2/2022 | Lee | ................... | F16M 11/125 |

* cited by examiner

SUPPORTING DEVICE

CROSS REFERENCE TO RELATED APPLICATION

This application claims the benefit of U.S. Provisional Application Ser. No. 63/064,729 filed on Aug. 12, 2020, and the benefit of Taiwan Patent Application Serial No. 110205957 filed on May 24, 2021. The entirety of each application is incorporated herein by reference.

BACKGROUND OF THE INVENTION

1. Field of the Invention

The present invention relates to a supporting device, especially a supporting device which can electrically drive a display to pivot.

2. Description of Related Art

Generally, the display needs to be fixed on a supporting device to be stably disposed on the wall or on the working surface for users to use, and users may have different requirements for the setting of the display under different scenario and environment. Currently, there is known that a supporting device can manually adjust the portrait state and the landscape state of the display, but the manual operation is inconvenient for the users. Therefore, in order to allow the user to easily adjust the portrait state and the landscape state of the display, a supporting device that can electrically control the bearing board, which bears the display, of the supporting device is needed.

SUMMARY OF THE INVENTION

An objective of the present invention is to provide a supporting device. The output of the driving module directly or indirectly penetrates through the supporting element and the bearing board, in which the supporting element is used to support the bearing board, and the bearing board can pivot relative to the supporting element. When the driving module is activated, it drives the bearing board to rotate relative to the supporting element to make the display pivot between the portrait state and the landscape state. In this way, the supporting device of the present invention allows the user to electrically pivot the display and change the portrait state or landscape state of the display without manual operation which is not only more convenient, but also more precise to adjust the position of the display.

To achieve the aforesaid objective, a supporting device for supporting a display is disclosed. The display defines a normal axis. The supporting device includes an upright, a slider, a bearing module, a driving module, a transfer module, and a control module. The slider is slidably disposed in the upright, and partially extends outward from the upright. The bearing module includes a bearing board and a supporting element, the bearing board is configured to bear the display, and the supporting element is connected to the slider. The driving module is disposed on the supporting element. The transfer module is connected between the driving module and the bearing board. The control module is electrically connected to the driving module. The control module controls the driving module to drive the transfer module for making the bearing board rotate relative to the supporting element about the normal axis, so that the display changes between a portrait state and a landscape state.

In one embodiment, the driving module includes a rotating shaft, the transfer module includes a driving hole, and the rotating shaft is inserted into the driving hole to drive the transfer module.

In one embodiment, the transfer module further includes a fixing plate and a rotating plate, and the fixing plate and the rotating plate are fixed to the bearing board respectively. When the driving module drives the transfer module, the fixing plate and the rotating plate drive the bearing board to rotate.

In one embodiment, the transfer module further includes a friction element which is disposed between the bearing board and the supporting element. The friction element penetrates through the rotating plate and is fixed to the supporting element.

In one embodiment, the supporting device further includes a sensor which is electrically connected to the control module, and the bearing module further includes an extending piece which is disposed on the bearing board. When the extending piece rotates along with the bearing board and triggers the sensor, the sensor transmits at least one sensing signal to the control module, and the control module controls the driving module according to the sensing signal to make the rotating shaft stop rotating.

In one embodiment, the friction element includes a first friction body and a second friction body which jointly clamp the rotating plate. When the bearing board rotates relative to the supporting element, the rotating plate rotates between the first friction body and the second friction body.

In one embodiment, at least one of the first friction body and the second friction body includes at least one positioning protrusion, the supporting element further includes a plurality of positioning apertures, and the at least one positioning protrusion engages with the positioning apertures.

In one embodiment, the first friction body includes a small diameter section, the second friction body has a center hole, and the small diameter section penetrates through the rotating plate and the center hole and is fixed to the supporting element.

In one embodiment, the first friction body further includes a large diameter section which is connected to the small diameter section, the second friction body further includes an annular plate, the center hole is formed on the annular plate, and the large diameter section and the annular plate jointly clamp the rotating plate.

In one embodiment, the rotating plate includes at least one stop block, and the supporting element includes at least one convex block. When the bearing board rotates to a limit position relative to the supporting element, the stop block contacts the convex block.

In one embodiment, the driving hole is formed on the fixing plate, and the rotating shaft is inserted into the driving hole along the normal axis to engage with the fixing plate. When the rotating shaft rotates, the rotating shaft drives the fixing plate and the bearing board to rotate synchronously.

In one embodiment, the supporting element further includes a main board, the main board is extending substantially perpendicular to the normal axis, and the rotating shaft is parallel to the normal axis and penetrates through the main board parallel to the normal axis.

In one embodiment, the supporting device further includes two hinges, and the supporting element further includes two wing boards. The wing boards bendingly extend from the main board and are opposite to each other. The hinges are spaced apart from each other and each of the hinges is connected between the wing boards and the slider so that the driving module and the supporting element are able to tilt relative to the slider for changing a tilt angle of the display.

In one embodiment, the transfer module further includes a worm shaft, a worm gear and a central shaft. The worm shaft is sleeved on the rotating shaft, the worm gear is sleeved on the central shaft, the worm shaft and the worm gear are engaged with each other. When the rotating shaft rotates, the rotating shaft drives the worm shaft and the worm gear to make the central shaft rotate synchronously.

In one embodiment, the driving hole is formed on the worm shaft, and the rotating shaft is perpendicular to the normal axis and penetrates through the driving hole.

In one embodiment, the supporting element further includes a main board and a supporting board, the supporting board bendingly extends from the main board and is substantially parallel to the normal axis, and the rotating shaft penetrates through the supporting board.

In one embodiment, the supporting device further includes a hinge, and the supporting element further includes two wing boards which are spaced apart from each other and respectively bendingly extend from the main board to two sides of the supporting board. The hinge is connected between the wing boards and the slider so that the driving module and the supporting element are able to tilt relative to the slider to change a tilt angle of the display.

The detailed technology and preferred embodiments implemented for the present invention are described in the following paragraphs accompanying the appended drawings for people skilled in this field to well appreciate the features of the claimed invention.

DETAILED DESCRIPTION OF THE PREFERRED EMBODIMENT

Reference will now be made in detail to the embodiments of the present invention, examples of which are illustrated in the accompanying drawings, and are not intended to limit the present invention, applications or particular implementations described in these embodiments. Wherever possible, the same reference numbers are used in the drawings and the description to refer to the same or like parts. It shall be appreciated that, in the following embodiments and the attached drawings, elements unrelated to the present invention are omitted from depiction; and dimensional relationships among individual elements in the attached drawings are provided only for ease of understanding, but not to limit the actual scale.

Figure 1:
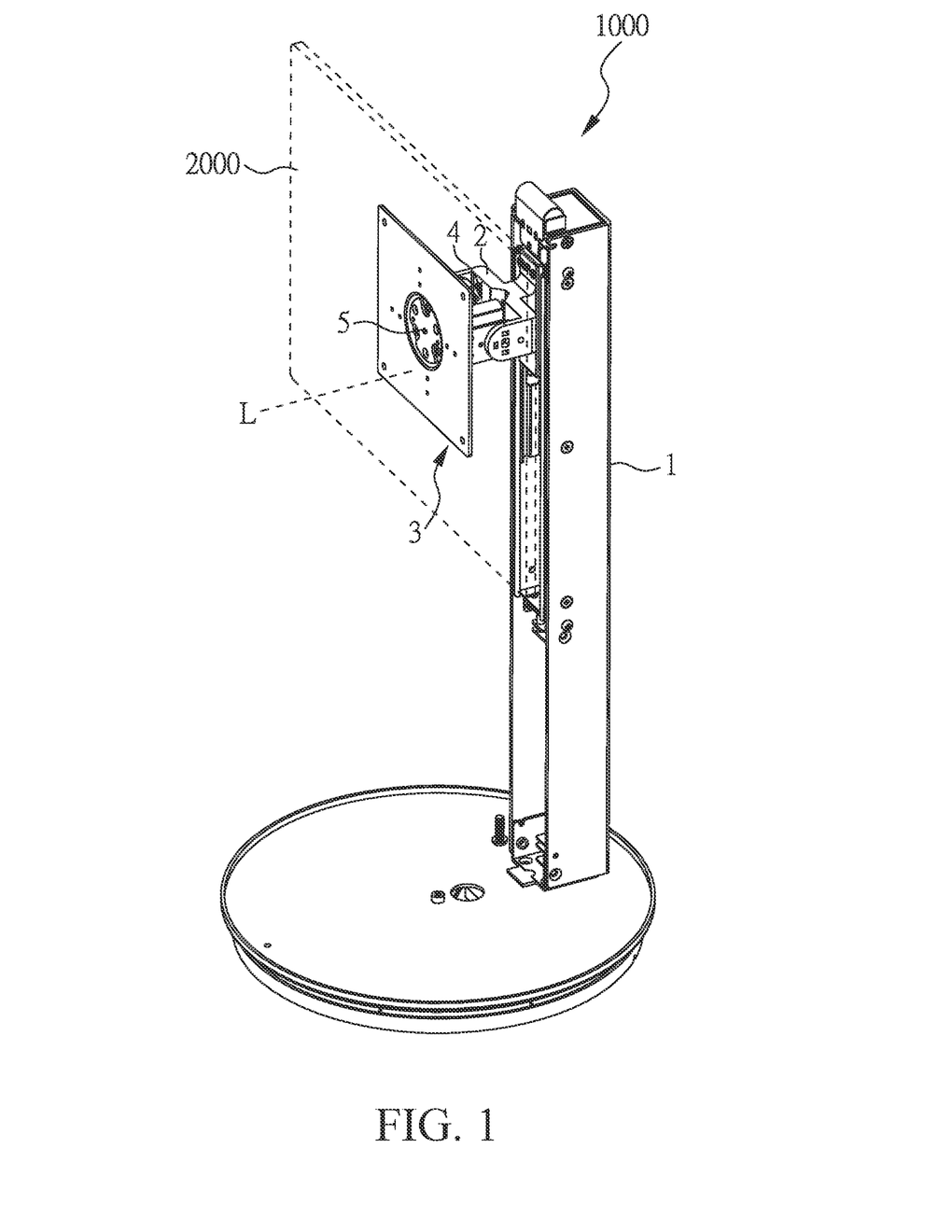
FIG. 1 is a perspective view of the supporting device of a first embodiment according to the present invention.

Reference is made to FIG. 1 to FIG. 6 for a first embodiment of the present invention. FIG. 1 is a perspective view of the supporting device 1000 according to the present invention. The supporting device 1000 is used for supporting a display 2000. The display 2000 is defined with a normal axis L which is perpendicular to a screen of the display 2000. The supporting device 1000 includes an upright 1, a slider 2, a bearing module 3, a driving module 4, a transfer module 5, a control module 6, a sensor 7, a power module 8, and a hinge 9. The slider 2 is slidably disposed in the upright 1, and partially extends outward from the upright 1.

Figure 2:
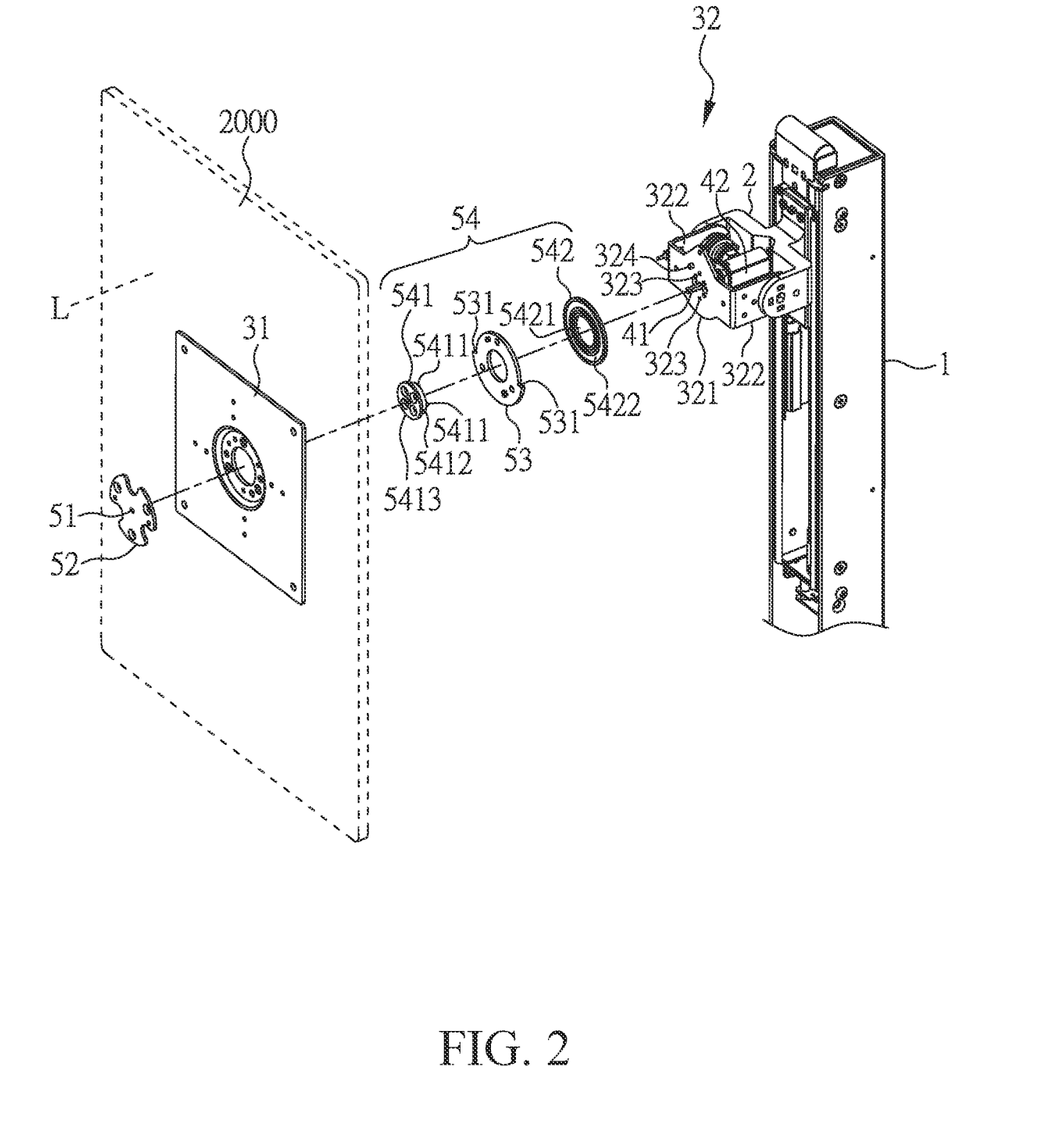
FIG. 2 is a partial exploded view of the supporting device of the first embodiment according to the present invention.
Figure 3:
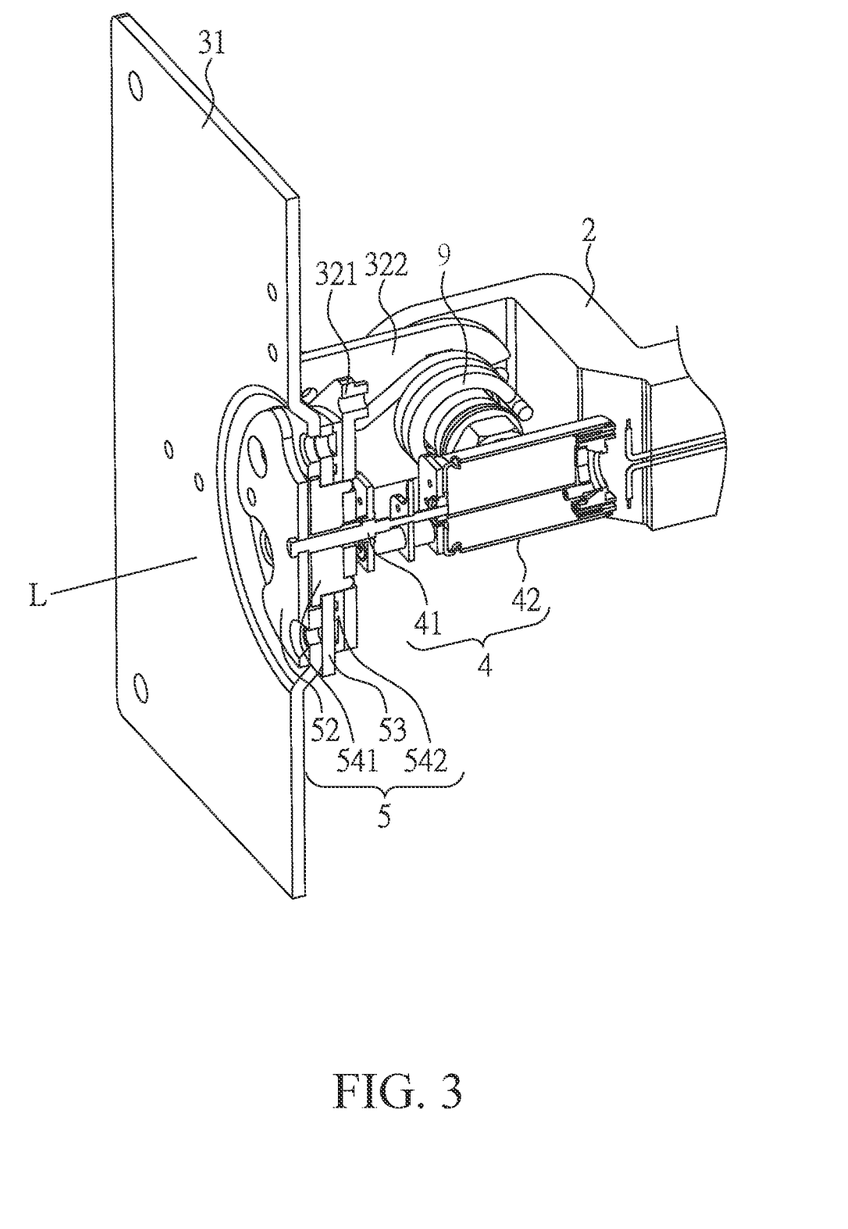
FIG. 3 is a cross sectional view of the supporting device of the first embodiment according to the present invention.

Reference is made to FIG. 2 and FIG. 3. FIG. 2 is a partial exploded view of the bearing module 3 and the transfer module 5. FIG. 3 is a cross sectional view of the supporting device 1000. The bearing module 3 includes a bearing board 31 and a supporting element 32. The bearing board 31 is used for bearing the display 2000. The supporting element 32 is connected to the slider 2, and includes a main board 321, two wing boards 322, a plurality of positioning apertures 323, and at least one convex block 324. The main board 321 is substantially perpendicular to the normal axis L which means that the main board 321 is substantially parallel to the display 2000. The two wing boards 322 are opposite to each other, bendingly extends from two sides of the main board 321 respectively, and are screwed to the two sides of the slider 2. The wing boards 322 and the main board 321 are approximately perpendicular. The positioning apertures 323 may engage with positioning protrusions of other elements to fix. The convex block 324 is disposed on the main board 321 to limit the rotation of the bearing board 31.

Figure 4:
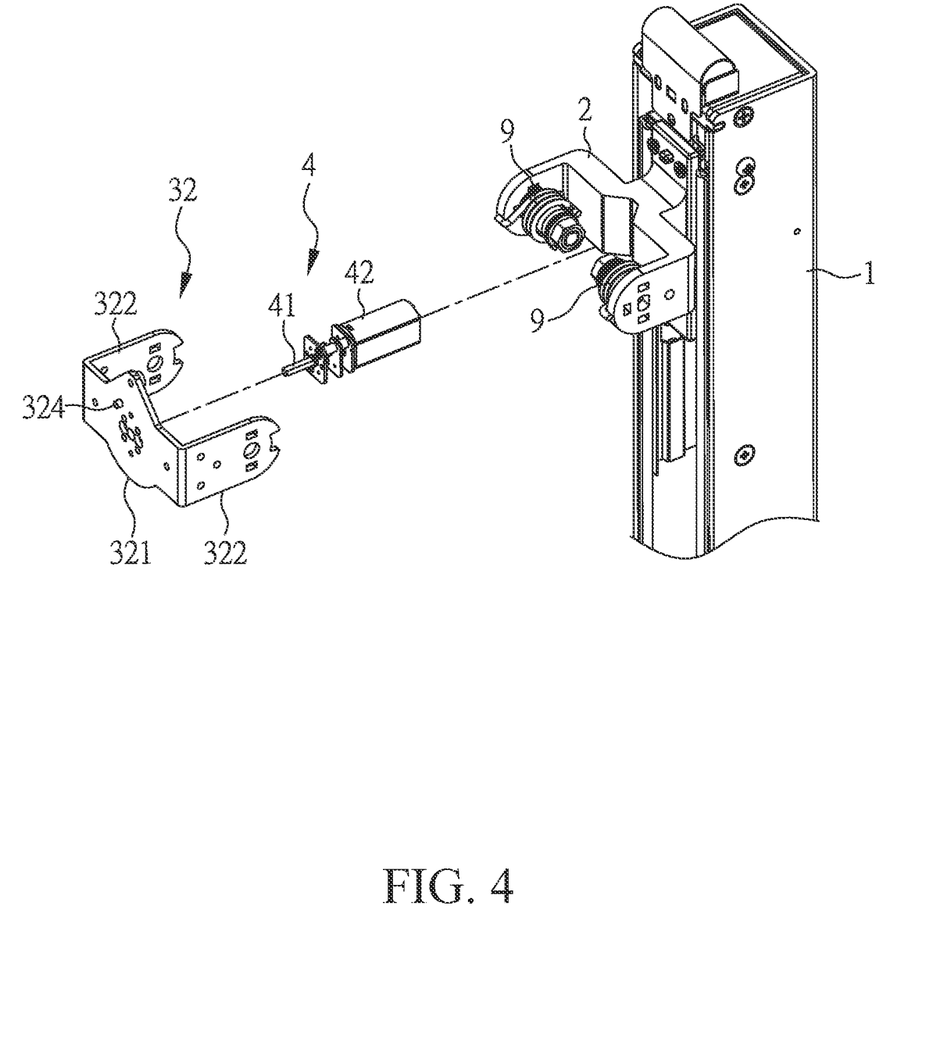
FIG. 4 is a top view of the supporting device of the first embodiment according to the present invention.

Next, please refer to FIG. 3 and FIG. 4. The driving module 4 may be a motor which is disposed on the supporting element 32, and includes a rotating shaft 41 and a motor body 42. The motor body 42 is disposed between the supporting element 32 and the slider 2, and is connected to the rotating shaft 41. In this embodiment, the rotating shaft 41 penetrates through the main board 321 and the bearing board 31, and is parallel to the normal axis L.

Reference is made to FIG. 2 and FIG. 3 again, the transfer module 5 is connected between the driving module 4 and the bearing board 31, and includes a rotating hole 51, a fixing plate 52, a rotating plate 53, and a friction element 54. The rotating hole 51 is formed on the fixing plate 52. The rotating shaft 41 is parallel to the normal axis L, penetrates through the rotating hole 51, and engages with the fixing plate 52 to drive the driving module 5. The fixing plate 52 is fixed to the front side of the bearing board 31, and the rotating plate 53 is fixed to the back side of the bearing board 31 so that the bearing board 31 can rotate along with the fixing plate 52 and the rotating plate 53.

The friction element 54 is disposed between the bearing board 31 and the supporting element 32, penetrates through the rotating plate 53, and is fixed to the supporting element 32. Specifically, the friction element 54 includes a first friction body 541 and a second friction body 542, wherein the first friction body 541 is disposed between the bearing board 31 and the rotating plate 53, and the second friction body 542 is disposed between the rotating plate 53 and the supporting element 32, and thus the first friction body 541 and the second friction body 542 jointly clamp the rotating plate 53. The first friction body 541 and the second friction body 542 are used as the medium and buffer between the bearing plate 31, the rotating plate 53 and the supporting element 32. Since the rotating plate 53 and the supporting element 32 are not directly contacted, the wearing damage can be avoided.

The first friction body 541 includes at least one positioning protrusion 5411, a small diameter section 5412, and a large diameter section 5413. The large diameter section 5413 is connected to a side of the small diameter section 5412, and the at least one positioning protrusion 5411 is formed on the other side, opposite to the large diameter section 5413, of the small diameter section 5412. The second friction body 542 has a center hole 5421 and an annular plate 5422, and the center hole 5421 is formed on the annular plate 5422.

As shown in FIG. 2, by the small diameter section 5412 of the first friction body 541 penetrating through the rotating plate 53 and the center hole 5421 of the second friction body 542, and the at least one positioning protrusion 5411 engaging with the positioning apertures 323 of the supporting element 32, the first friction body 541 can be fixed to the supporting element 32. The small diameter section 5412 can be designed to be approximately the sum of the thickness of the annular plate 5422 of the second friction body 542 and the rotating plate 53, so that the large diameter section 5413 of the first friction body 541 can press the rotating plate 53 and the second friction body 542 against the supporting element 32. In this case, the large diameter section 5413 of the first friction body 541 and the annular plate 5422 of the second friction body 542 jointly clamp the rotating plate 53.

Since the first friction body 541 and the second friction body 542 can prevent the rotating plate 53 from directly contacting or rubbing against the bearing board 31 and the supporting element 32, the first friction body 541 and the second friction body 542 will not rotate when the bearing board 31 rotates relative to the supporting element 32. In other words, only the rotating board 53 rotates between the first friction body 541 and the second friction body 542.

It shall be noted that, the number of positioning protrusions and the number of positioning apertures are only used for illustration, and are not limited. Since the positioning apertures can also be used for engaging with the positioning protrusions of other elements, the number of positioning apertures can be greater than the number of positioning protrusions during actual production, but it is not limited thereto.

Figure 6:
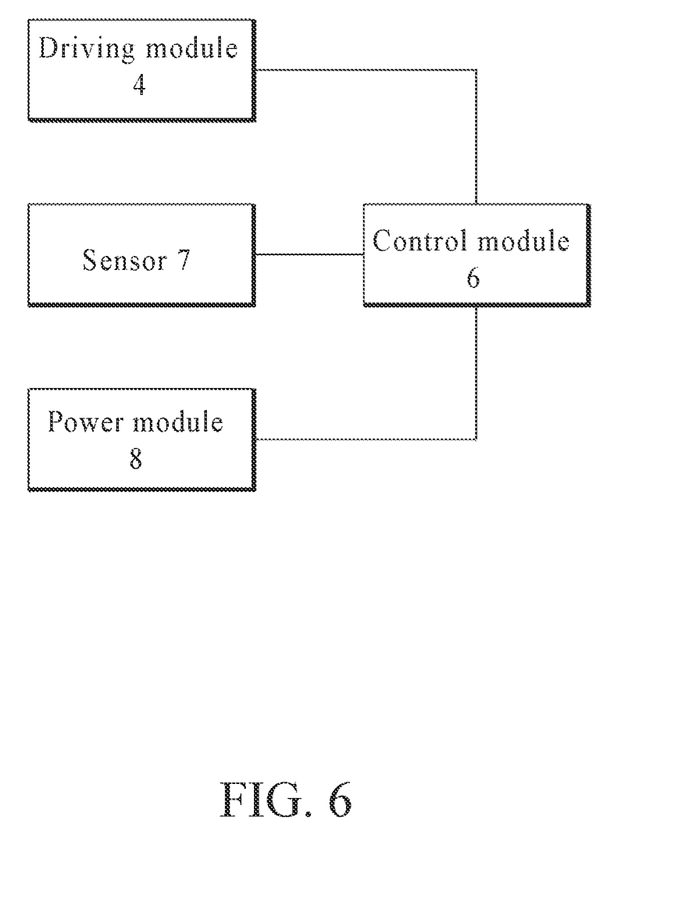
FIG. 6 is a schematic view of connections of the electrical elements of the supporting device according to the present invention.

Reference is made to FIG. 6, the control module 6 is electrically connected to the driving module 4 and the power module 8. The power module 8 provides electricity to the control module 6 so that the control module 6 can control the motor body 42 of the driving module 4 start operating. Then the rotating shaft 41 which is connected to the motor body 42 will rotate correspondingly so that the control module 6 can drive the transfer module 5 via the driving module 4. The fixing plate 52 of the transfer module 5 drives the bearing board 31 to rotate synchronously, so that the bearing board 31 rotates relative to the supporting element 32 about the normal axis L, and the angle of the display 2000 can be changed between the portrait state and the landscape state.

Under the aforementioned structure of electric driving and electric sensing of the driving module 4 and the sensor 7, a final physical protection mechanism may be further provided. In detail, the rotating board 53 has at least one stop block 531. When the bearing board 31 rotates, relative to the supporting element 32, to a limit position, the stop block 531 of the rotating board 53 contacts the convex block 324 of the supporting element 32. To be more specific, please refer to FIG. 2, the rotating board 53 has two stop blocks 531 on the left side and the right side, the convex block 324 may be disposed on the main board 321 adjacent to one of the positioning apertures 323. It is assumed that the display 2000 is originally in the landscape state, and when the fixing plate 52 and the rotating board 53 drive the bearing board 31 to rotate 90 degrees counterclockwise, and the driving module 4 does not stop in time, then the stop block 531 on the right side will contact the convex block 324 to prevent the bearing board 31 from continuously rotating counterclockwise, and to fix the display 2000 in the portrait state. On the contrary, if the bearing board 31 rotates 90 degrees clockwise, and the driving module 4 does not stop in time, then the stop block 531 on the left side will contact the convex block 324 to prevent the bearing board 31 from continuously rotating clockwise, and to fix the display 2000 in the portrait state. It shall be noted that, the number of the convex block and the number of the stop block are only used for illustration, and are not limited thereto.

Figure 5:
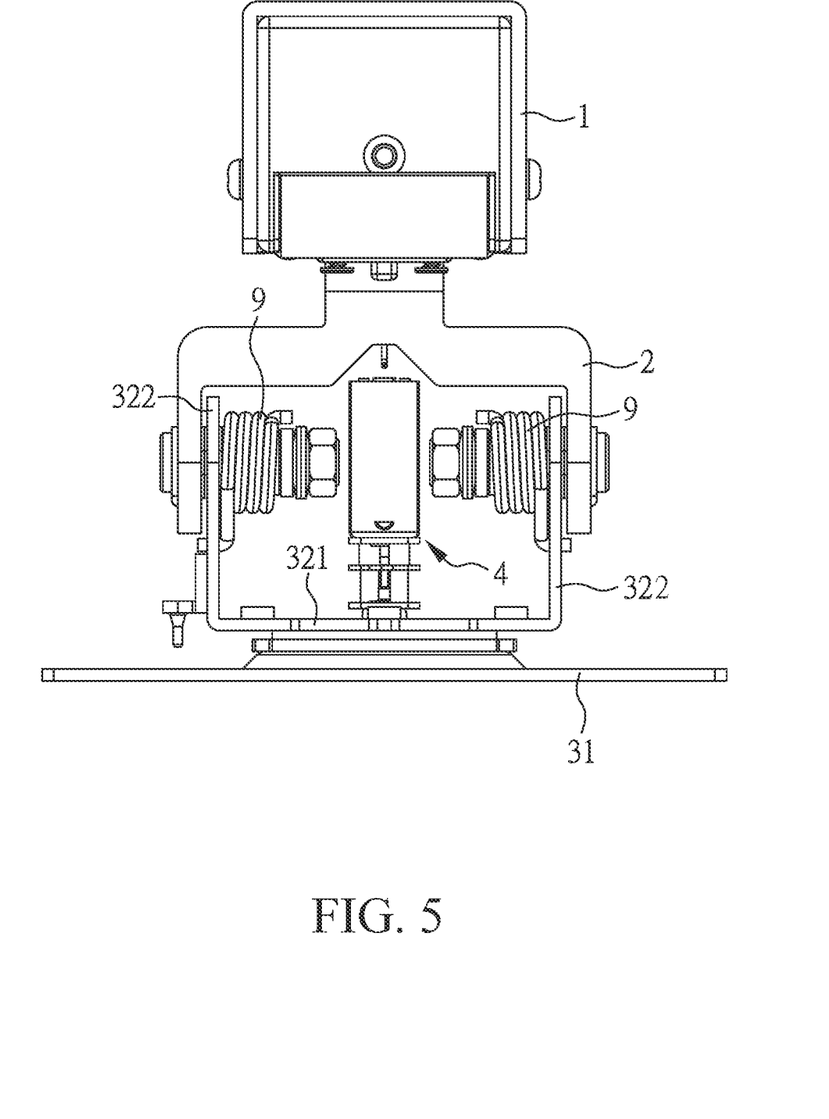
FIG. 5 is a partial exploded view of the supporting device of the first embodiment according to the present invention.

In one embodiment, the supporting device 1000 includes two hinges 9. The two hinges 9 are spaced apart from each other, and each of them is connected to one of the two wing boards 322 and the slider 2, as shown in FIG. 5. When a force is applied to the display 2000, the bearing board 31 and the supporting element 32 can tilt relative to the slider 2, thereby changing the tilt angle of the display 2000. In this embodiment, the driving module 4 is disposed on the supporting element 32, and the rotating shaft 41 directly penetrates the bearing board 31. Thus, in the progress of tilting the display 2000, the driving module 4 also tilts accordingly.

Figure 7:
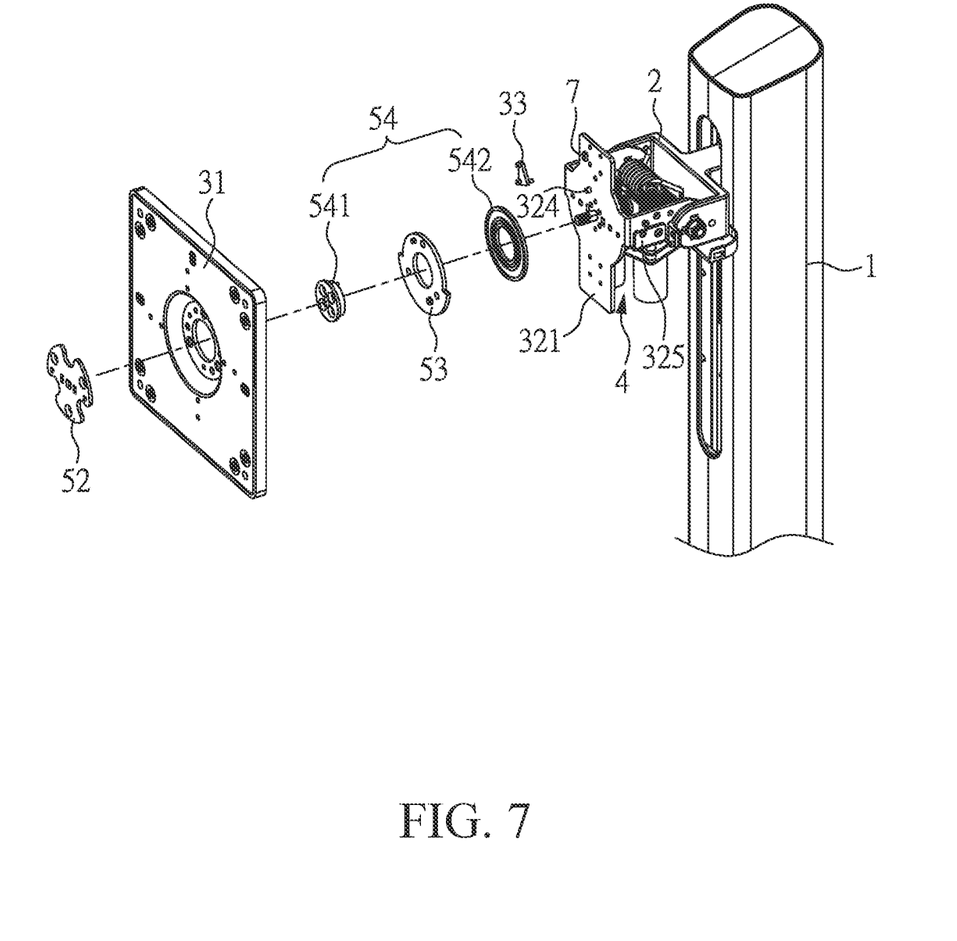
FIG. 7 is a partial exploded view of the supporting device of a second embodiment according to the present invention.
Figure 8:
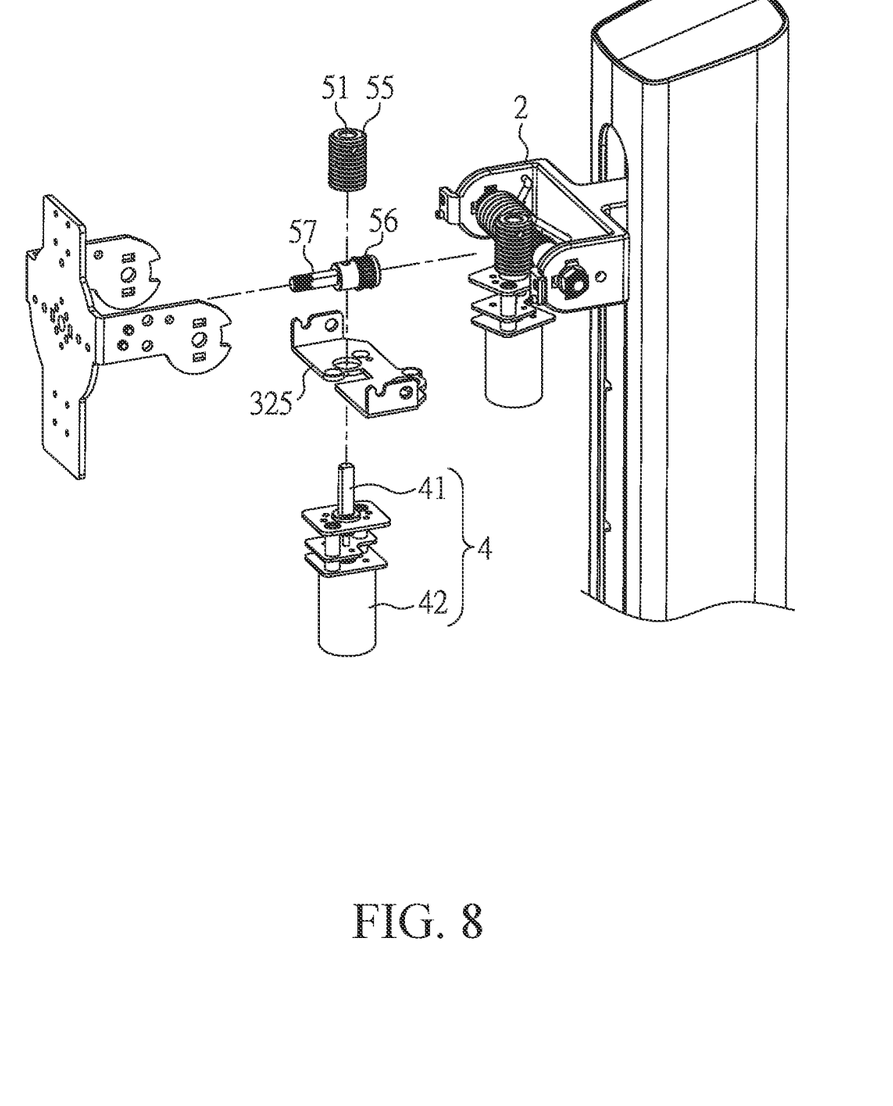
FIG. 8 is a partial exploded view of the supporting device of the second embodiment according to the present invention.

Reference is made to FIG. 7 to FIG. 10 for a second embodiment of the present invention. FIG. 7 and FIG. 8 are partial exploded views of the supporting device 1000 according to the present invention. The transfer module 5 further includes a worm shaft 55, a worm gear 56 and a central shaft 57. Different from the first embodiment that the driving hole 51 is formed on the fixing plate 52, in this embodiment, the driving hole 51 is formed on the worm shaft 55. The rotating shaft 41 of the driving module 4 is inserted into the driving hole 51 perpendicular to the normal axis L; that is, the worm shaft 55 is sleeved on the rotating shaft 41. The worm gear 56 is sleeved on the central shaft 57, and the worm shaft 55 and the worm gear 56 are engaged with each other. When the power module 8 provides electricity to the control module 6 to control the motor body 42 of the driving module 4 start operating, the rotating shaft 41 rotates and drives the worm shaft 55 and the worm gear 56 to make the central shaft 57 rotate correspondingly.

Furthermore, the supporting element 32 further includes a supporting board 325 which bendingly extends from the main board 321 and is substantially parallel to the normal axis L to support the driving module 4. The rotating shaft 41 penetrates through the supporting board 325 and is inserted into the driving hole 51 formed on the worm shaft 55.

Figure 9:
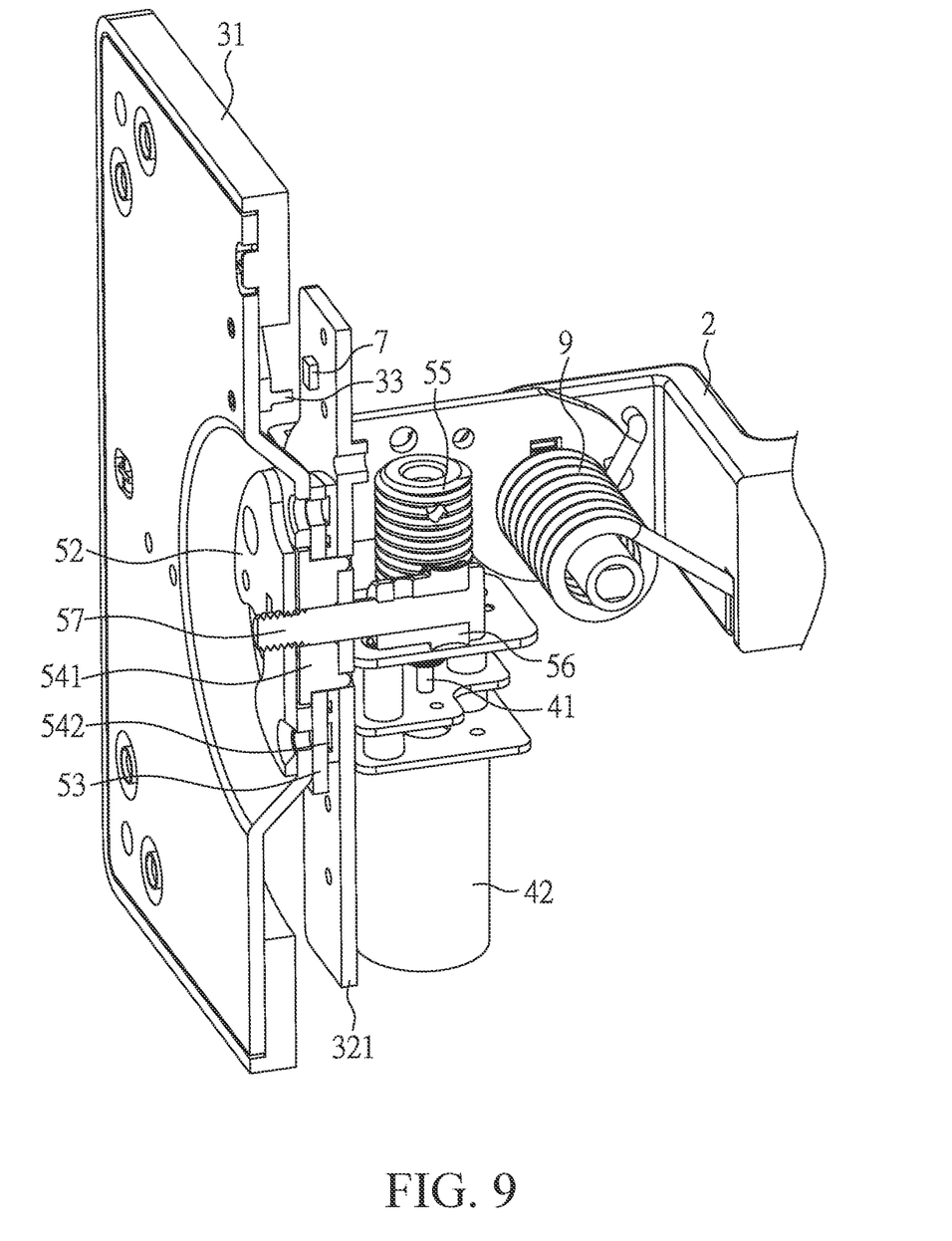
FIG. 9 is a top view of the supporting device of the second embodiment according to the present invention.

Reference is made to FIG. 6, FIG. 7, and FIG. 9, the supporting device 1000 further includes a sensor 7 which may be implemented as a photo interrupter. The sensor 7 is electrically connected to the control module 6. The bearing module 3 further includes an extending piece 33 which is disposed on the bearing board 31. When the extending piece 33 rotates along with the bearing board 31 and triggers the sensor 7, the sensor 7 transmits at least one sensing signal to the control module 6, and the control module 6 controls the driving module 4 according to the sensing signal to make the rotating shaft 41 stop rotating.

More specifically, the positions of the sensor 7 and the extending piece 33 depend on the consideration that the sensor 7 must be triggered when the display 2000 is changing into the portrait state or the landscape state. That is to say, the extending piece 33 can just trigger the sensor 7 to control the rotating shaft 41 of the driving module 4 to stop driving the bearing board 31 to rotate when the display 2000 is about to the portrait state or the landscape state. Based on the arrangement of the sensor 7, a final physical protection mechanism can be additionally provided, such as the contact between the stop block 531 of the rotating plate 53 and the convex block 324 of the supporting element 32, which will not be repeated herein.

Figure 10:
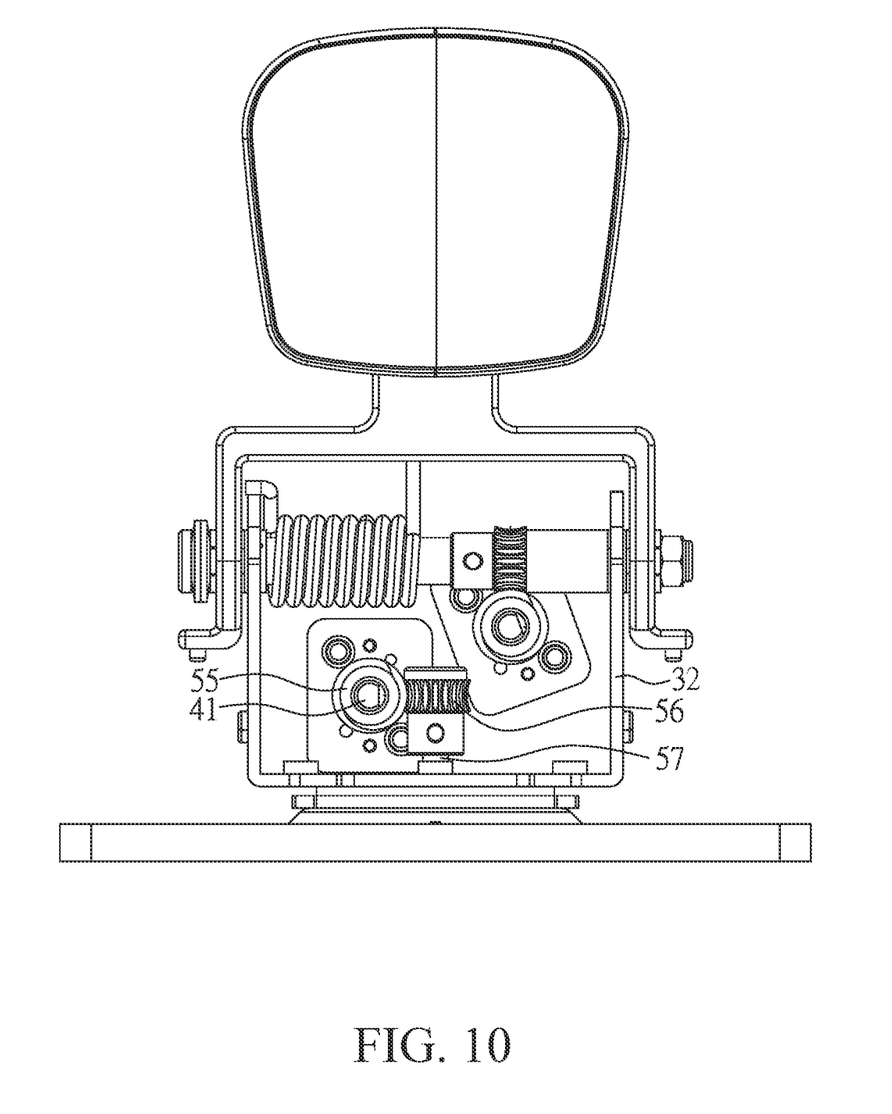
FIG. 10 is a cross sectional view of the supporting device of the second embodiment according to the present invention.

Different from the supporting device 1000 of the first embodiment which sets two hinges 9, the supporting device 1000 of this embodiment only shows one hinge 9 in the drawings, and the hinge 9 is connected to one of the wing boards 322 and the slider 2 so that the driving module 4 and the supporting element 32 is able to tilt relative to the slider 2 to change a tilt angle of the display 2000. The other one of the wing boards 322 can connect to another set of worm shaft, worm gear, central shaft, and motor to electrically control the tilt angle of the display 2000, as shown in FIG. 10.

According to the above, in the supporting device of the present invention, the rotating shaft of the driving module directly penetrating through the supporting element and the bearing board; alternatively, the rotating shaft penetrates through the worm shaft and indirectly connects to the supporting element and the bearing plate through the central shaft in the worm gear to control the bearing board and make the display pivot between the portrait state and the landscape state. Further, in the present invention, two friction bodies are used to clamp the rotating plate to avoid abrasion caused by the direct contact between the rotating plate, the supporting element and the bearing board. Accordingly, the supporting device of the present invention not only allows the user to electrically control the pivot of the display to set the position of the display more accurately, but also reduces the friction between the elements and increases the service life of the supporting element.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention within the scope of the following claims.

What is claimed is:

1. A supporting device for supporting a display, the display defining a normal axis, and the supporting device comprising:
    an upright;
    a slider being slidably disposed in the upright, and partially extending outward from the upright;
    a bearing module comprising a bearing board and a supporting element, the bearing board being configured to bear the display, and the supporting element being connected to the slider;
    a driving module being disposed on the supporting element;
    a transfer module being connected between the driving module and the bearing board, and comprising a fixing plate and a rotating plate, the fixing plate and the rotating plate being fixed to the bearing board respectively; and
    a control module being electrically connected to the driving module;
    wherein the control module controls the driving module to drive the transfer module for making the bearing board rotate relative to the supporting element about the normal axis, so that the display changes between a portrait state and a landscape state; and
    wherein when the driving module drives the transfer module, the fixing plate and the rotating plate drive the bearing board to rotate.

2. The supporting device as claimed in claim 1, wherein the driving module comprises a rotating shaft, the transfer module comprises a driving hole, and the rotating shaft is inserted into the driving hole to drive the transfer module.

3. The supporting device as claimed in claim 2, wherein the transfer module further comprises a friction element which is disposed between the bearing board and the supporting element, and the friction element penetrates through the rotating plate and is fixed to the supporting element.

4. The supporting device as claimed in claim 3, further comprising a sensor being electrically connected to the control module, and the bearing module further comprising an extending piece being disposed on the bearing board, wherein when the extending piece rotates along with the bearing board and triggers the sensor, the sensor transmits at least one sensing signal to the control module, and the control module controls the driving module according to the sensing signal to make the rotating shaft stop rotating.

5. The supporting device as claimed in claim 4, wherein the friction element comprises a first friction body and a second friction body which jointly clamp the rotating plate, and when the bearing board rotates relative to the supporting element, the rotating plate rotates between the first friction body and the second friction body.

6. The supporting device as claimed in claim 5, wherein at least one of the first friction body and the second friction body comprises at least one positioning protrusion, the supporting element further comprises a plurality of positioning apertures, and the at least one positioning protrusion engages with the positioning apertures.

7. The supporting device as claimed in claim 6, wherein the first friction body comprises a small diameter section, the second friction body has a center hole, and the small diameter section penetrates through the rotating plate and the center hole and is fixed to the supporting element.

8. The supporting device as claimed in claim 7, wherein the first friction body further comprises a large diameter section which is connected to the small diameter section, the second friction body further comprises an annular plate, the center hole is formed on the annular plate, and the large diameter section and the annular plate jointly clamp the rotating plate.

9. The supporting device as claimed in claim 8, wherein the rotating plate comprises at least one stop block, the supporting element comprises at least one convex block, and when the bearing board rotates to a limit position relative to the supporting element, the stop block contacts the convex block.

10. The supporting device as claimed in claim 2, wherein the driving hole is formed on the fixing plate, the rotating shaft is inserted into the driving hole along the normal axis to engage with the fixing plate, and when the rotating shaft rotates, the rotating shaft drives the fixing plate and the bearing board to rotate synchronously.

11. The supporting device as claimed in claim 10, wherein the supporting element further comprises a main board, the main board is extending substantially perpendicular to the normal axis, and the rotating shaft is parallel to the normal axis and penetrates through the main board.

12. The supporting device as claimed in claim 11, further comprising two hinges, the supporting element further comprising two wing boards, the wing boards bendingly extending from the main board and being opposite to each other, the hinges being spaced apart from each other, and each of the hinges being connected between the wing boards and the slider so that the driving module and the supporting element are able to tilt relative to the slider for changing a tilt angle of the display.

13. The supporting device as claimed in claim 2, wherein the transfer module further comprises a worm shaft, a worm gear and a central shaft, the worm shaft is sleeved on the rotating shaft, the worm gear is sleeved on the central shaft, the worm shaft and the worm gear are engaged with each other, and when the rotating shaft rotates, the rotating shaft drives the worm shaft and the worm gear to make the central shaft rotate synchronously.

14. The supporting device as claimed in claim 13, wherein the driving hole is formed on the worm shaft, and the rotating shaft is perpendicular to the normal axis and penetrates through the driving hole.

15. The supporting device as claimed in claim 14, wherein the supporting element further comprises a main board and a supporting board, the supporting board bendingly extends from the main board and is substantially parallel to the normal axis, and the rotating shaft penetrates through the supporting board.

16. The supporting device as claimed in claim 15, further comprising a hinge, the supporting element further comprising two wing boards being spaced apart from each other and respectively bendingly extending from the main board to two sides of the supporting board, and the hinge being connected between the wing boards and the slider so that the driving module and the supporting element are able to tilt relative to the slider to change a tilt angle of the display.

\* \* \* \* \*